United States Patent
Gauthier et al.

(10) Patent No.: US 7,588,679 B2
(45) Date of Patent: *Sep. 15, 2009

(54) SYSTEM FOR GAS-SOLID SEPARATION AND FOR STRIPPING FOR FLUIDIZED-BED CATALYTIC CRACKING UNITS

(75) Inventors: Thierry Gauthier, Brignais (FR); Jean-François Le Coz, Nanterre (FR); Régis Andreux, Francheville (FR)

(73) Assignee: Institute Francais du Petrole, Rueil Malmaison Cedex (FR)

( * ) Notice: Subject to any disclaimer, the term of this patent is extended or adjusted under 35 U.S.C. 154(b) by 258 days.

This patent is subject to a terminal disclaimer.

(21) Appl. No.: 11/641,962

(22) Filed: Dec. 20, 2006

(65) Prior Publication Data
US 2007/0181463 A1    Aug. 9, 2007

(30) Foreign Application Priority Data
Dec. 21, 2005   (FR) .................................. 05 13068

(51) Int. Cl.
C10G 47/02 (2006.01)
F27B 15/08 (2006.01)

(52) U.S. Cl. ...................... 208/108; 208/113; 208/146; 208/163; 208/168; 422/144; 422/147

(58) Field of Classification Search ................ 422/144, 422/147; 55/348, 349; 95/269; 208/108, 208/113, 146, 163, 168

See application file for complete search history.

(56) References Cited

U.S. PATENT DOCUMENTS

| | | | |
|---|---|---|---|
| 4,581,205 A | | 4/1986 | Schatz et al. |
| 4,664,888 A | * | 5/1987 | Castagnos, Jr. ............. 422/147 |
| 5,259,855 A | * | 11/1993 | Ross et al. ..................... 55/349 |
| 5,552,120 A | * | 9/1996 | Sechrist et al. .............. 422/144 |
| 5,837,129 A | | 11/1998 | Ross et al. |
| 6,113,777 A | * | 9/2000 | Gauthier et al. ............. 208/161 |
| 6,166,282 A | * | 12/2000 | Miller ......................... 585/638 |
| 6,296,812 B1 | | 10/2001 | Gauthier et al. |
| 6,616,900 B1 | * | 9/2003 | Lomas ........................ 422/147 |
| 6,692,552 B2 | * | 2/2004 | Benham ....................... 95/269 |
| 6,797,026 B2 | * | 9/2004 | Sechrist et al. ................ 55/348 |
| 7,077,949 B2 | * | 7/2006 | Bakker et al. ............... 208/113 |
| 7,429,363 B2 | * | 9/2008 | Yuan et al. .................. 422/147 |

FOREIGN PATENT DOCUMENTS

| | | | |
|---|---|---|---|
| EP | 0532071 A | | 3/1993 |
| WO | WO 99/11739 A | | 4/1986 |
| WO | WO 2005/037422 | * | 4/2005 |

\* cited by examiner

*Primary Examiner*—Nina Bhat
(74) *Attorney, Agent, or Firm*—Millen, White, Zelano, Branigan, P.C.

(57) ABSTRACT

A system for gas-solid separation and for stripping combined into a single so-called separation/stripping zone that is compact and thus contributes to the quality of the yields of the unit. This system can be applied to FCC units and makes it possible to obtain very good separation effectiveness while reducing the contact time between the gas and the solid at the same time.

16 Claims, 4 Drawing Sheets

SYSTEM FOR GAS-SOLID SEPARATION AND FOR STRIPPING FOR FLUIDIZED-BED CATALYTIC CRACKING UNITS

FIELD OF THE INVENTION

The invention relates to a device for separation and stripping and its use in a process for fluidized-bed catalytic cracking of hydrocarbons, whose conventional abbreviation is FCC.

The catalytic cracking units consist of a reaction zone that is generally tubular in shape, essentially vertical and elongated and called "riser" if the flow is upward and "dropper" if the flow is downward, in which the catalyst is brought into contact with a hydrocarbon feedstock, then separated from hydrocarbon effluents in one or more separation stages, comprising at least one cyclone stage.

In the text below, the device that makes possible the primary separation of the catalyst from the reaction effluents located downstream from the reaction zone and upstream from one or more subsequent separation stages, generally carried out by means of cyclone stages, will be called a separation zone.

The objective of the zone for separating catalyst and reaction effluents is to lower the concentration of solid particles in the gaseous effluents, whereby the effectiveness of separation of the particles is generally more than 50% and often varies from 75% to 99%.

The ratio of the solid to gas mass flow rates in the gas-solid flow at the inlet of the separation zone is generally between 2 and 50, and preferably between 3 and 10.

The surface velocity of the gas at the outlet of the riser (1) is generally between 3 m/s and 30 m/s, and preferably between 10 m/s and 25 m/s.

The invention relates to a device for separation and stripping at the top of the FCC riser units, making possible at the same time a high degree of gas-solid separation, a pre-stripping of the solid fraction recovered at the end of said separation, and integration with the stripping zone itself, which is reflected by a noteworthy compactness.

Let us recall that it is essential in the FCC units to carry out an effective stripping so as not to entrain toward regeneration hydrocarbons that are adsorbed on the surface of the catalyst which, by their combustion, would entrain an imbalance of the heat balance of the unit.

In addition, the effective separation of the gas, which is evacuated directly to the downstream separation zones, makes it possible to obtain a better selectivity of upgradable products by limiting the production of dry gases (essentially methane and ethane), generally obtained from the heat degradation of the primary cracking products.

An effective and fast gas-solid separation makes it possible to stop the catalytic reaction by minimizing the dwell time of the products of the reaction in the separation zone and by preserving the structure of the yields as it is obtained at the outlet of the riser.

The assembly of the zones for separation and stripping combined in this invention into a single so-called separation/stripping zone is as compact as possible and therefore contributes to the quality of the yields of the unit.

EXAMINATION OF THE PRIOR ART

A large number of patents describe gas/solid separation systems that make it possible to reduce the dead volume between the stripping zone and the cyclone stage or stages, whereby the latter are often directly connected to the riser of the FCC units.

Thus, the publication "FCC Closed-Cyclone System" by A. A. Avidan, F. J. Krambeck, H. Owen and P. H. Schipper, appearing in Oil & Gas Journal, March 1990, and the U.S. Pat. No. 5,055,177 describe a quick separation by means of cyclones that are connected directly to the riser.

In these systems, the cyclones that are connected to the riser are kept inside a large-sized chamber that generally also encompasses a second cyclone stage.

The gas that is separated in the first stage returns in the second cyclone stage to undergo a more intensive dust extraction there.

The catalyst is directed via return legs of the cyclones to the dense phase of a stripping fluidized bed in which the vapor is injected in counter-current of the catalyst to desorb the hydrocarbons.

The hydrocarbons that are obtained from stripping are then evacuated to the dilute phase of the reactor and introduced into the separation system at the second cyclone stage.

The fact of having two cyclone stages, one connected to the riser carrying out the primary separation, the second connected to the gas outlets of the cyclones of the first stage, makes it necessary to have a very large diameter for the chamber encompassing the two cyclone stages. This chamber is passed through both by the gases that are obtained from the stripping zone and by the gases that are entrained by the catalyst into the return legs of the first stage.

The gases that are obtained from the stripping zone are therefore exposed to heat degradation because the contact time of the hydrocarbons that are stripped or entrained into the return legs with the catalyst will be, because of the volume of the chamber encompassing the cyclone stages, on the order of 20 seconds to several minutes.

This invention will eliminate this drawback by making the chamber encompassing the cyclone stages disappear. The cyclones will then be outside the chamber that encompasses only the zone for primary separation and stripping, object of this invention.

The rapid separation can also be carried out in a single chamber with induced vorticity as described in the patent U.S. Pat. No. 5,584,985. This technology, commonly called "vortex separation system" in English, which can be translated by systeme de separation par vortex [system for separation by vortex], offers the advantage of simultaneously combining the separation and the stripping.

In the device that is described in the cited patent, the solid is flattened against the wall under the action of centrifugal force and flows toward the bottom of the chamber where it is brought into contact with a stripping gas that is evacuated with the desorbed hydrocarbons toward the top of the separation chamber.

To obtain good separation effectiveness with such a system, it is necessary to limit the size of the separation chamber so that the centrifugal force that is being exerted on the particles is high enough. This is incompatible with a rate of ascent of the stripping gases that is low enough to limit the downward re-entrainment of particles after their separation.

The fact of combining a separation and a stripping in the same chamber generally does not make it possible to carry out these two operations correctly. In addition, and this is a significant problem of this technology, the catalyst that is separated from the gas preferably flows at the wall and therefore is not easily brought into contact with the stripping gas that distributes it over the entire passage section of the chamber.

In this invention, the stripping zone is preceded by a pre-stripping zone that forms an integral part of the separation system and that makes it possible to avoid the difficulty mentioned.

The patent EP 1 017 762 B1 describes a compact system for separation and stripping in which chambers for separation and circulation are placed in an alternating fashion around the riser, whereby all of these chambers are contained in an outer jacket whose lower portion corresponds to the stripping zone.

In the configuration described in the patent EP 1 017 762 B1, the outer jacket may or may not contain a cyclone stage.

In the case where the cyclones are external to the outer jacket, a problem of thermal expansion may arise between the outer jacket and the cyclone stage or stages. An expansion joint is then positioned on the evacuation pipe to the secondary separator.

The device for separation and stripping according to this invention makes it possible to avoid any problem of thermal expansion to the extent that, as will be explained in detail, the separation chambers and the riser form a first assembly that is no longer integral with the pre-stripping chambers and therefore makes possible their free expansion.

According to the device for separation and stripping of this invention, the effectiveness of the separation of the particles is generally more than 50% and preferably more than 75%.

The device for separation and stripping according to this invention is furthermore sized so as to limit the dwell time of gases in said device to less than 3 seconds under the operating conditions.

SUMMARY DESCRIPTION OF THE FIGURES

FIG. 1 makes it possible to visualize the configuration of a pre-stripping chamber. It shows a secondary separation system that constitutes a cyclone stage, which is in no way limiting, whereby the invention is compatible with several cyclone stages arranged in series.

FIG. 2 is in no way limiting in connection with the secondary separation system, shown here by a cyclone stage.

SUMMARY DESCRIPTION OF THE INVENTION

The numbering between parentheses in the text corresponds to the numbering in FIGS. 1 to 4.

The device for separation and stripping of a gaseous mixture and a solid particle flow according to this invention preferably can be applied to fluidized-bed catalytic cracking units that have a central tube reactor that is essentially vertical and elongated in shape and is called "riser" in English terminology.

It comprises a jacket (50) that contains a number of separation chambers (2) and a number of pre-stripping chambers (3), distributed in vaults and in an alternating fashion around a central reactor (1), essentially vertical and elongated in shape, closed by an upper section (15), and in which the gaseous mixture and the flow of particles to be separated circulate, Each separation chamber (2), comprising in its upper portion an inlet opening (2) that communicates with the reactor (1) and with a centrifuging zone (23) that makes it possible to separate the particles of the gaseous mixture by means of the deflector (4). The centrifuging zone (23) is defined so as to make possible, in an essentially vertical plane, the rotation of the gaseous mixture and particles according to an angle of at most 180 degrees relative to the vertical. The particles that have an essentially vertical and upward movement at the inlet of the centrifuging zone (23) are found at the outlet of said zone with an essentially vertical and downward movement, Each separation chamber (2) also comprises an outside wall (21-18-27), an inside wall that is merged with the outside wall of reactor (1), and two essentially vertical lateral walls (24) that are also the lateral walls of the pre-stripping chambers (3), at least one of the lateral walls (24) of each separation chamber (2) comprising a first lateral communication (5) located below the inlet opening (20) and bringing the gaseous mixture to the adjacent pre-stripping chamber (3), Each separation chamber (2) also comprises, in its lower portion (27), a second opening (6) that makes possible an essentially axial outlet of particles located below the first lateral communication (5) of the outlet of the gaseous mixture, the second particle outlet opening (6) that communicates below separation chambers (2) with a stripping zone (3) that contains at least one primary stripping means (11), The jacket (50) also comprises a pipe (14) for evacuating the mixture that contains the gaseous effluents that are obtained from pre-stripping chambers (3), located essentially in the shaft of the reactor (1) and connected, on the one hand, to said pre-stripping chambers (3) by the upper openings (8) and to at least one secondary separator (16) making it possible to separate the solid particles that are contained in the gaseous effluent coming from the evacuation pipe (14), whereby said secondary separator (16) comprises an outlet (9) of gaseous effluents, and a particle outlet (17) that dips into the stripping zone (30), said stripping zone (30) communicating with said pipe (14) for evacuation of the gas-solid mixture, via the lower openings (7) of the pre-stripping chambers (3), Each pre-stripping chamber (3) that has oblique walls (19) fixed to lateral walls (24) and to the outside wall (22) of the jacket (50), the difference of thermal expansion between, on the one hand, the riser (1) and the separation chambers (2) forming a first assembly, and, on the other hand, the pre-stripping chambers (3) forming a second assembly, naturally being compensated for by the gaps that separate the two assemblies.

In a variant of the device according to the invention, the thermal expansion between, on the one hand, the riser (1) and the separation chambers (2), and, on the other hand, the pre-stripping chambers (3) is compensated for by an expansion joint that is placed on the riser (1), between the lower side of the deflector (4) and the side of the lower opening (6) of the separation chamber (3).

Advantageously, the device for separation and stripping according to this invention is defined such that the sum of the lateral communications sections (5) of the separation chamber (2) has essentially the same value as the sum of the sections of openings (20), and, simultaneously, such that the sum of the sections of the upper openings (8) of the pre-stripping chambers (3) has essentially the same value as the sum of the openings (20).

In each of its separation chambers (2), the device for separation and stripping according to this invention has a deflector (4) that has a shape that is essentially parallel to the outside wall (21) and that extends vertically at least up to the side of the lower edge of the lateral communications (5) and up to a side corresponding essentially to the largest diameter of said outside wall (21).

In its upper portion, the deflector (4) can conform to the shape of the lateral communication (5) of the wall (24), or optionally deviate therefrom, but can remain essentially parallel to it.

The device for separation and stripping according to this invention also has pre-stripping means (10) that are placed immediately below particle outlet openings (6) of the separation chambers (2).

The device for separation and stripping according to this invention has a stripping zone (30) that advantageously comprises means (12) for standardizing the flow of particles located in the upper portion of said stripping zone (30) and for promoting the contact between said particles and the stripping gas. These means (12) can be inclined plates that are placed in baffles, structured packings, or other means, of which a nonlimiting description can be found in the patents EP 2778869, U.S. Pat. No. 2,440,620, U.S. Pat. No. 2,472, 502, U.S. Pat. No. 2,481,439, U.S. Pat. No. 6,224,833 or EP 1124350 or in books such as "materiel et equipment [Material and Equipment]," Volume 4 of the Petroleum Refining Encyclopedia by P. Trambouze, edited in Technip. Editions, 1999.

The device for separation and stripping according to this invention communicates via a pipe (14) that is essentially vertical and is located in the shaft of the riser (1) with at least one secondary separation system that generally consists of a cyclone stage (16), which is equipped with a return leg (17), whereby the cyclones are outside or inside the jacket (50), but whose lower end dips into the stripping zone (30).

The device for separation and stripping according to the invention can comprise means for standardizing the flow of the particles located in the return leg of the solids (27) from the separation chamber (2), whereby these means may be of the same type or of a type that is analogous to the means (12) described above.

DETAILED DESCRIPTION OF THE INVENTION

The invention relates to a device for separation and stripping of a gaseous mixture and a flow of particles obtained from a cylindrical and elongated reaction zone (1) along an essentially vertical axis, called a riser (1) in the text below, comprising an outer jacket (50), a number of separation chambers (2) fixed to the riser (1), and a number of pre-stripping chambers (3) fixed to the outer jacket (50), whereby said chambers (2) and (3) are distributed into vaults and in an alternating fashion around said central riser (1). The riser has a closed section (15) that is in continuity with the upper portion of the separation chambers (2) and the pre-stripping chambers (3). In this way, the entire gas-solid suspension is forced to pass into the separation chambers by the openings (20).

The chambers of the same type, separation (2) or pre-stripping (3), generally have the same dimension, in particular the same aperture angle. However, the separation chambers (2) and the pre-stripping chambers (3) may have different aperture angles.

As a whole, there is an axial symmetry of chambers around the axis of the riser (1), and the number of separation chambers varies between 1 and 8, preferably between 2 and 4.

Likewise, the number of pre-stripping chambers varies between 1 and 8, preferably between 2 and 4.

The separation chambers (2) and the riser (1) form an integral assembly delimited by the four walls 1, 24, 21-18-27, and 24.

The pre-stripping chambers (3) are delimited by their outside wall (22) and the outside wall of the riser (1).

The geometry of the pre-stripping chambers (3) is preferably completed by conical portions (19) that are fixed to the outside wall (22). In this way, the pre-stripping chambers (3) are not physically linked to the riser (1), and the difference of thermal expansion between, on the one hand, the riser (1) and the separation chambers (2) that form a first assembly, and, on the other hand, the pre-stripping chambers (3) that form a second assembly, is naturally compensated for by the gaps that separate the two assemblies, this without an expansion joint according to a preferred embodiment of the invention.

In the rest of this description below, the geometry of the separation chambers (2) and then that of the pre-stripping chambers (3) will first be presented.

Each separation chamber (2), in its upper portion, comprises an inlet opening (20) that communicates with the riser (1) and with a centrifuging zone (23) so as to separate the solid particles from the gaseous mixture by centrifugal effect.

The centrifuging zone (23) is located in the upper portion of the separation chamber (2).

It is defined by means of a deflector (4) that makes possible the rotating in a vertical plane of the gaseous mixture and particles that are obtained from the riser (1) at an angle of at most 180 degrees relative to the vertical. Thus, the particles that have an essentially vertical and upward movement at the inlet of the centrifuging zone (23) are found at the outlet of said zone with an essentially vertical and downward movement.

The gaseous flow that is loaded with solid particles and is obtained from the riser (1) passes integrally into the separation chambers (2) via openings (20), because the riser has a closed section (15) that is located essentially at or above the upper portion of the openings (20).

Each separation chamber (2) also comprises two essentially vertical lateral walls (24) that are also the lateral walls of the pre-stripping chambers (3) that are adjacent to said separation chamber (2).

At least one of the vertical walls (24) of each chamber (2) comprises a lateral opening (5), located below the inlet opening (20), bringing the gaseous mixture from the separation chamber (2) to the adjacent pre-stripping chamber (3).

Preferably, each vertical wall (24) will use a lateral opening (5) that thus makes it possible to bring the separation chamber under consideration (2) to the two pre-stripping chambers (3) that are adjacent to it. In the text below, the lateral openings (5) will be called lateral communications.

In addition, each separation chamber (2) comprises lateral walls (24), one outside wall (21) preferably advancing up to a maximum diameter (Dmax), then preferably being extended by a vertical or conical portion (18) up to a diameter Dmin that is less than or equal to Dmax, then optionally also extending via an essentially vertical portion (27).

According to a preferred embodiment of the invention, the vertical or conical portion (18) and optionally the essentially vertical portion (27) of the separation chambers (2) are equipped with means promoting the standardization of the gas-solid flow over said portions (18) and (27) as well as the gas-solid contact.

These means can be inclined plates placed in baffles, structured packings or other means of which a nonlimiting description can be found in the patents EP 2778869, U.S. Pat. No. 2,440,620, U.S. Pat. No. 2,472,502, U.S. Pat. No. 2,481, 439, U.S. Pat. No. 6,224,833 or EP 1124350, or in books such as "materiel et équipement [Materiel and Equipment]," Volume 4 of the Petroleum Refining Encyclopedia, edited by P. Trambouze in Technip Editions, 1999.

Any element that makes it possible to standardize the gas-solid flow and top romote the gas-solid contact can be used within the scope of this invention.

The inside wall (1') of the separation chamber (2), which is merged with the outside wall of the riser (1), is located opposite this outside wall (21)-(18)-(27) that forms a continuous assembly.

The vertical walls (24) are rigidly connected to the outside wall of the riser (1).

In combination with the inside wall (1') and the lateral walls (24), the vertical portion (27) of the outside wall defines a second opening (6) that is located strictly below the level of the lateral communications (5), making possible an essentially axial outlet of the particles that are contained in the separation chamber (2).

A deflector (4), in a form that is essentially parallel to the outside wall (21 ) and limited to a height that is essentially equal to that of the outside wall (21), defines the centrifuging zone (23) in combination with said wall (21).

The deflector (4) preferably conforms to the shape of the lateral communications (5) that are cut on the lateral walls (24), but it can be closer to or further away from them while remaining essentially parallel to them.

The lower edge of the deflector (4) is preferably located at a level that is lower than the lower edge of the lateral communications (5).

The second outlet opening (6) of the particles communicates with a stripping zone (30) that is of essentially cylindrical shape and surrounds the riser (1).

Said stripping zone (30) is common to all of the separation chambers (2) and contains at least one primary stripping means (11), optionally completed by a secondary stripping means (31).

Each pre-stripping chamber (3) has an outside wall (22) and an inside wall that is opposite to the outside wall (22), which is merged with the outside wall of the riser (1).

The outside wall (22) extends beyond the angular sector corresponding to the pre-stripping chambers (3) and covers the outside wall 21-18-27 of the separation chambers (2), such that the outside wall (22) is merged with the outer jacket (50).

In its upper portion, each pre-stripping chamber (3) comprises an opening (8) that communicates with an evacuation pipe (14) that is located essentially in the shaft of the riser (1) and above the level of the closed section (15) of the latter.

The pipe (14) allows the evacuation of the mixture, which contains the gaseous effluents that is also loaded with a small portion of particles, to a secondary separator (16). Generally, the secondary separator (16) will consist of at least one cyclone stage outside of the jacket (50).

The outside wall (22) is integral with the evacuation pipe (14) and the cyclone stage or stages that (is) are connected to the evacuation pipe (14).

In its lower portion, each pre-stripping chamber (3) also comprises an opening (7) that is defined by the outside wall (22), the inside wall (1'), and the lateral walls (24) and that communicates with the stripping zone (30).

In addition to lateral walls (24), each pre-stripping chamber (3) comprises a vertical or conical portion (19) that extends up to a diameter Dmin that is less than or equal to Dmax.

Generally, the vertical or oblique walls (19) of the pre-stripping chambers (3) are fixed to the outside wall (22), which avoids any problem of differential expansion between, on the one hand, the riser (1) and the separation chambers (2), and, on the other hand, said pre-stripping chambers (3).

Nevertheless, in a variant of the invention, the oblique walls (19) of the pre-stripping chambers (3) can be fixed to the lateral walls (24) and to the outside wall (22), which is then different from the wall 50.

In this case, the difference of heat expansion between, on the one hand, the riser (1) and the separation chambers (2), and, on the other hand, the pre-stripping chambers (3) is compensated for by an expansion joint that is placed on the riser (1), preferably between the lower side of the deflector (4) and the side of the lower opening (6) of the separation chamber (3).

The secondary separator (16), generally constituted by at least one cyclone stage in parallel, makes it possible to separate the particles that are contained in the gaseous effluent obtained from the evacuation pipe (14), whereby said secondary separator comprises an outlet (9) of gaseous effluents, and an outlet (17) of particles, generally called a return leg, dipped into the stripping zone (30).

Figure 1:
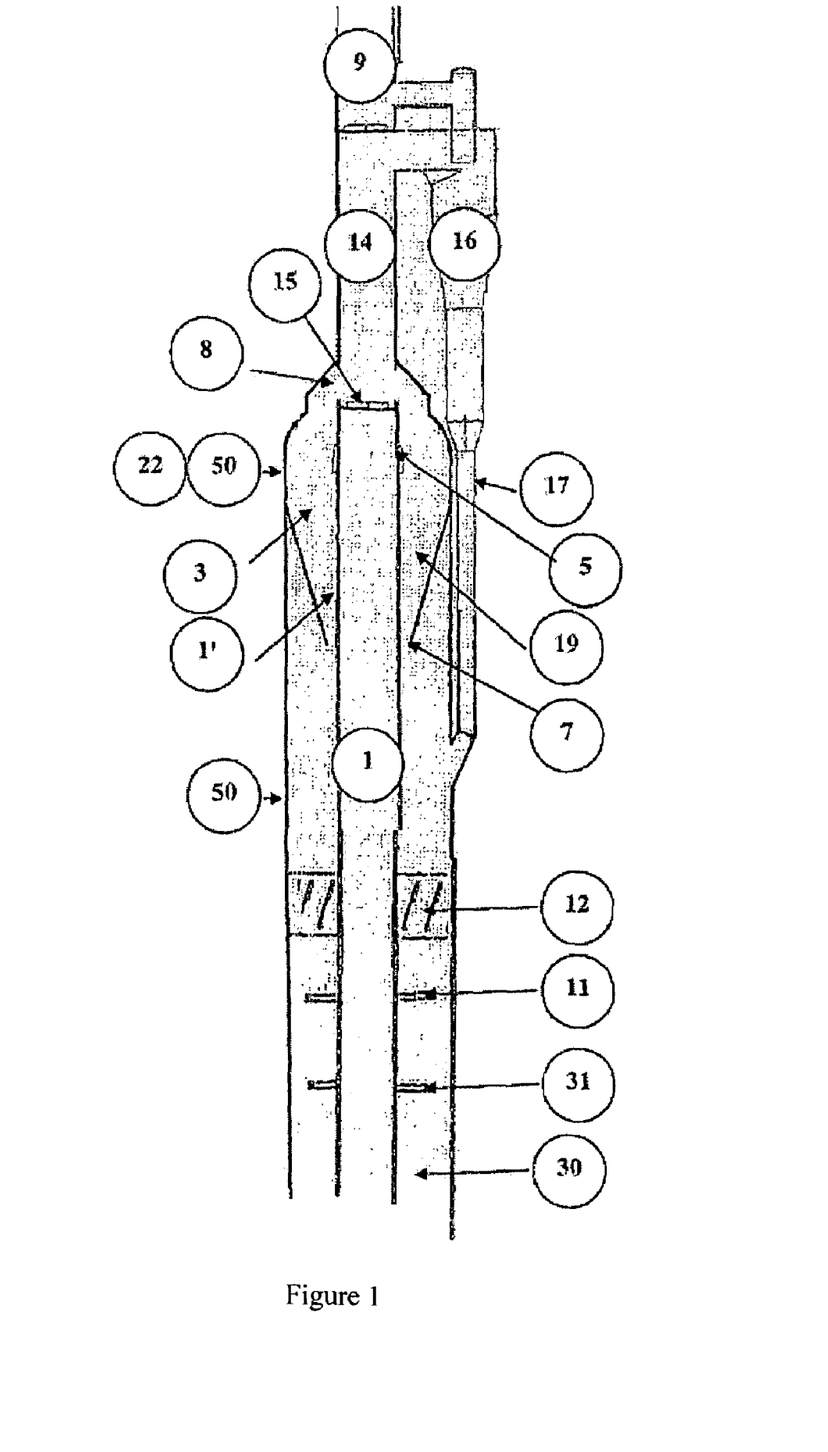
FIG. 1 shows a view taken through a pre-stripping chamber of the device according to the invention, positioned in the upper portion of an FCC riser.
Figure 2:
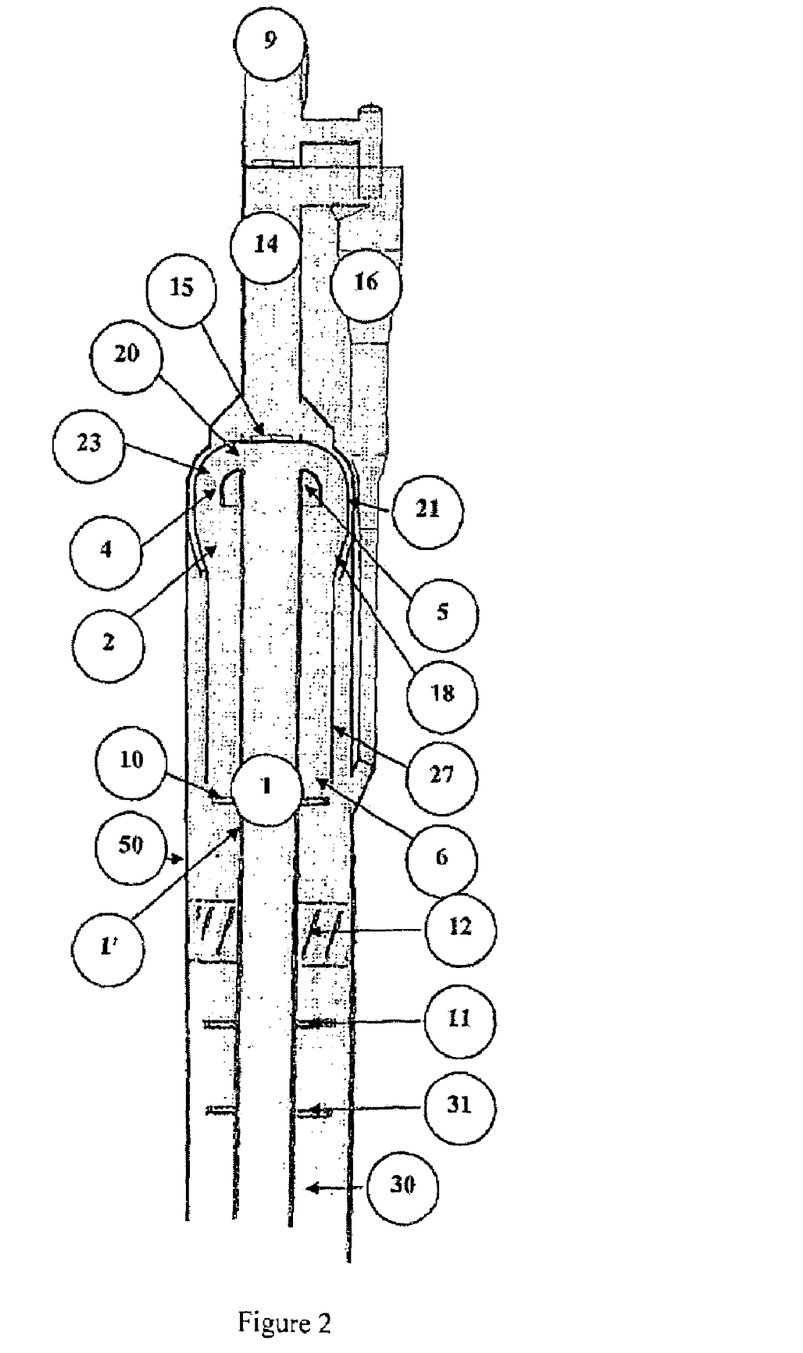
FIG. 2 shows a view taken through a separation chamber of the device according to the invention. It makes it possible to visualize the configuration of a separation chamber. In the same way.
Figure 3:
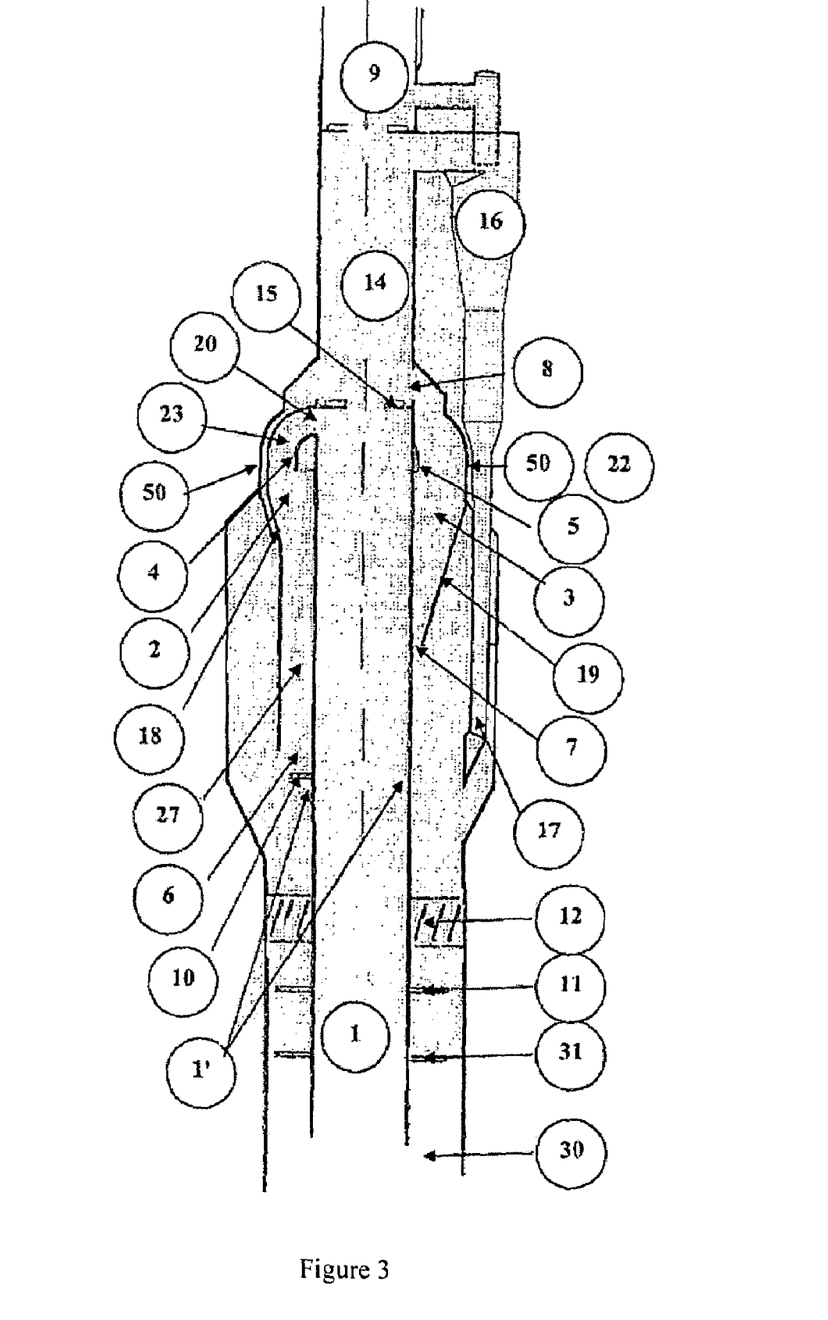
FIG. 3 shows a variant of the device according to the invention, in which the return legs of the cyclones that constitute the secondary separation system penetrate over the majority of their length inside the stripping zone.
Figure 4:
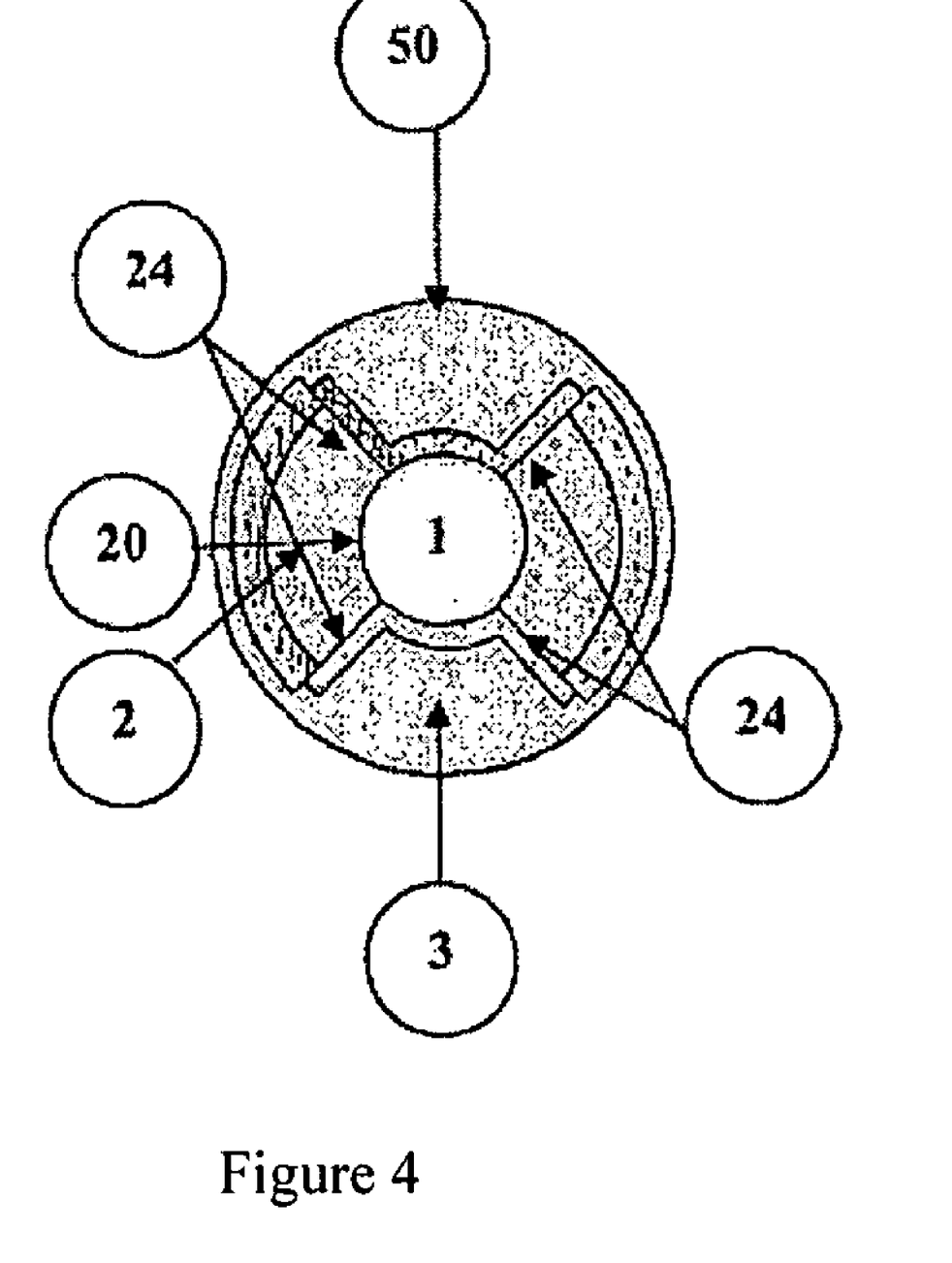
FIG. 4 is a top view of the device according to the invention that makes it possible to visualize the distribution of the separation chambers and pre-stripping chambers, as well as the walls that separate said chambers, in a vault.

The outlet of the gaseous effluents (9) optionally communicates with a second cyclone stage, not shown in FIGS. (1), (2) and (3).

According to a variant of the invention, the outlets of the particles (17) are outside the stripping zone (30) and only penetrate inside said zone (30) at their rear end.

According to another variant of the invention shown by FIG. 3, the outlets of the particles (17) penetrate over the majority of their length inside the outer jacket (50).

The outer jacket of the stripping zone (30) constitutes the extension of the outer jacket (50).

Additional stripping means (10) can be placed directly below the outlet openings of the particles of the separation chambers (2) to complete the stripping means (11) and (31) of the stripping zone (30).

The stripping effluents that are obtained are then evacuated upward through the pre-stripping chambers (3) after having passed through their lower opening (8), then they are treated in the secondary separator (16).

The device for separation and stripping according to the invention can operate optimally by adhering to the following rates of passage:

Gas flow rate at the top of the riser (1) of 5 m/s to 35 m/s, preferably from 10 m/s to 25 m/s Gas flow rate in the opening (20): from 5 m/s to 35 m/s, preferably from 10 m/s to 25 m/s Gas flow rate in the opening (5): from 5 m/s to 35 m/s, preferably from 10 m/s to 25 m/s Gas flow rate in the opening (7): from 0.3 m/s to 5 m/s, preferably from 1 m/s to 3 m/s Catalyst flow in the opening (6) of between 10 and 300 kg/(m$^2$·s), preferably from 50 to 200 kg/(m$^2$·s), with particles that are characterized by a grain density of between 1000 and 2000 kg/m$^3$, and a so-called "Sauter" mean diameter of between 40 and 100 microns.

The invention can operate according to two different methods:

1) The level of the particles forming a fluidized bed (of mean density of between 200 and 800 kg/m³, preferably 500 to 750 kg/m³ in the stripping zone (30) is significantly less than the level of the outlet opening (6) of the particles of the separation chambers (2).

About 30% to 50% of the gas and 95% to 99% of the particles that are obtained from riser (1) pass into the vertical or conical portion (18) of the separation chambers (2), the remainder passing into the pre-stripping chambers (3) through the lateral communications (5).

The pre-stripping chambers (3) recover stripping gases obtained from the stripping zone (30) through the opening (5) and 30 to 50% of the gases obtained from the outlet opening (6) and evacuated with the particles of the separation chambers (2) via the opening (7), and said particles are oriented toward the secondary separator (16).

2) The level of the particles in the stripping zone (30) is significantly more than the level of the opening (6) of the outlets of the particles of separation chambers (2). About 0 to 5% of gas and 50 to 95% of the particles that are obtained from the riser (1) pass into the vertical or conical portion (18) of the separation chambers (2), the remainder passing into the pre-stripping chambers (3) through the lateral communications (5).

The pre-stripping chambers (3) recover the stripping gases that are obtained from the stripping zone (30) and orient them to the secondary separator (16).

The second method is the preferred method in normal operating conditions.

The first mode is the mode preferred over transient operating conditions (starting and stopping).

EXAMPLE

In this example, all things being equal, furthermore, a separation system according to the prior art is compared to a separation system according to this invention.

The comparison relates to the effect of compactness provided by the device according to the invention.

Thus, a hydrocarbon catalytic cracking unit treating a hydrocarbon flow rate of 16,000 BPSD.

The catalyst flow rate in the form of solid particles is 600 tons/hour.

The outside diameter of the riser is 1300 mm.

According to the prior art, the stripping zone that surrounds a standard separator at the top of the riser, the secondary separator, and the primary and secondary stripping means has the following dimensions:

Height: 23 meters.

Maximum diameter: 6.25 meters.

According to the invention, the jacket (30) according to FIG. 1 has the following dimensions:

Height: 17 meters.

Maximum diameter: 3.5 meters.

The other primary dimensions of the device are as follows:

Diameter of the stripping zone (30): 3.5 meters

Distance separating the lateral walls of a separation chamber (2) from the wall of the riser (1): 0.8 m Width of the lateral communications (5): 0.3 meter Height of the lateral communications (5): 0.5 meter Height of the return leg of the outer secondary separator: 7 meters The mass of the unit that rests on the ground decreases by 70 tons relative to the device of the prior art.

The invention claimed is:

1. An apparatus for fluidized bed catalytic cracking of hydrocarbons, said apparatus comprising a separating and stripping a gaseous mixture and a particle flow, comprising a jacket (50), divided into a number of separation chambers (2) and a number of pre-stripping chambers (3) that are distributed radially and in an alternating fashion around a central reactor (1), which has an essentially vertical and elongated shape, closed by an upper section (15), and in which the gaseous mixture and the flow of particles to be separated circulates, each separation chamber (2), comprising in its upper portion an inlet opening (2) that communicates with the reactor (1) and with a centrifuging zone (23) that makes it possible to separate the particles of the gaseous mixture by means of a deflector (4), whereby the centrifuging zone (23) is defined for rotation in an essentially vertical plane of the gaseous mixture and particles according to an angle of at most 180 degrees, and each separation chamber (2) comprising an outside wall (21-18-27), an inside wall that is merged with the outside wall of reactor (1), and two essentially vertical lateral walls (24) that are also the lateral walls of the pre-stripping chambers (3), at least one of the lateral walls (24) of each separation chamber (2) comprising a first lateral communication (5), located below the inlet opening (20) for bringing the gaseous mixture to an adjacent pre-stripping chamber (3), each separation chamber (2) also comprising, in its lower portion (27), a second opening (6) that makes possible an essentially axial particle outlet located below the first lateral communication (5) of the outlet of the gaseous mixture, the second particle outlet opening (6) communicating below separation chambers (2) with a stripping zone (30) that contains at least one primary stripping means (11), the jacket (50) also comprising a pipe (14) for evacuating the mixture that contains the gaseous effluents that are obtained from pre-stripping chambers (3), located essentially in the shaft of the reactor (1) and connected, to said pre-stripping chambers (3)by the upper openings (8) and to at least one secondary separator (16) making it possible to separate the solid particles that are contained in a gaseous effluent from the evacuation pipe (14), whereby said secondary separator (16) comprises an outlet (9) for gaseous effluents, and a particle outlet (17) that dips into the stripping zone (30), said stripping zone (30) communicating with said pipe (14) for evacuation of the gas-solid mixture, via the lower openings (7) of the pre-stripping chambers (3), each pre-stripping chamber (3) having oblique walls (19) fixed to lateral walls (24) and to the outside wall (22) of the jacket (50), the difference of thermal expansion between the reactor (1) and the separation chambers (2) forming a first assembly, and, the pre-stripping chambers (3) forming a second assembly, the two assemblies being supported by a gap which allows for the difference of thermal expansion, and wherein the sum of the cross sectional area of the lateral communications (5) of the separation chambers (2) has essentially the same value as the sum of the cross sectional area of the openings (20), and the sum of the cross sectional area of the upper openings (8) of the pre-stripping chambers (3) has essentially the same value as the sum of the cross sectional area of the openings (20).

2. A device according to claim 1, in which the deflector (4) has a shape that is essentially parallel to the outside wall (21) and extends vertically at least up to the side of the lower edge of the lateral communications (5) and up to a side corresponding essentially to the largest diameter of said outside wall (21).

3. A device according to claim 2, in which the deflector (4), in its upper portion, conforms to the shape of the lateral communication (5) of the wall (24).

4. A device according to claim 1, in which the pre-stripping means (10) are located immediately below outlet openings (6) of the particles of separation chambers (2).

5. A device according to claim 1, in which the stripping zone (30) comprises means (12) for standardizing the flow of particles located in the upper portion of said stripping zone (30).

6. A device according to claim 1, comprising a return leg for the solids (27) of the separation chamber (2) comprising means for standardizing the flow of the particles located in said return leg (27).

7. A device according to claim 6, wherein the means for standardizing the flow of the particles in return leg (27) are baffles or structured packings.

8. A device according to claim 1, in which the thermal expansion between the reactor (1) and the separation chambers (2), and, on the other hand, the pre-stripping chambers (3) is compensated for by an expansion joint that is placed on the reactor (1) between the lower side of the deflector (4) and the side of the lower opening (6) of the separation chamber (3).

9. A device for separation and stripping according to claim 1, in which the number of separation chambers is between 1 and 8.

10. A device for separation and stripping according to claim 1, in which the number of pre-stripping chambers is between 1 and 8.

11. A process for fluidized-bed catalytic cracking of hydrocarbons, comprising providing a device according to claim 1, and catalytically cracking hydrocarbons in said device.

12. A process according to claim 11, in which the velocity of the gas at the top of reactor (1) is between 5 m/s and 35 m/s.

13. A process according to claim 12, in which the velocity of the gas in the opening (20) is between 5 m/s and 35 m/s.

14. A process according to claim 13, in which the velocity of the gas in the opening (5) is between 5 m/s and 35 m/s.

15. A process according to claim 11, in which the velocity of the gas in the opening (7) is between 0.3 and 5 m/s.

16. A process according to claim 11, in which the flow of the catalyst in the opening (6) is between 10 and 300 kg/(m$^2$·s), with particles that are characterized by a grain density of between 1000 and 2000 kg/m3, and a Sauter mean diameter of between 40 and 100 microns.

* * * * *

UNITED STATES PATENT AND TRADEMARK OFFICE
CERTIFICATE OF CORRECTION

| | | |
|---|---|---|
| PATENT NO. | : 7,588,679 B2 | Page 1 of 1 |
| APPLICATION NO. | : 11/641962 | |
| DATED | : September 15, 2009 | |
| INVENTOR(S) | : Gauthier et al. | |

It is certified that error appears in the above-identified patent and that said Letters Patent is hereby corrected as shown below:

Title Pg, Item (73) Assignee: reads "Institute Francais du Petrole", should read -- Institut Francais du Petrole --.

Signed and Sealed this

Tenth Day of November, 2009

David J. Kappos
*Director of the United States Patent and Trademark Office*